Patented Apr. 10, 1934

1,954,152

UNITED STATES PATENT OFFICE 1,954,152

ANÆSTHETIC AND PROCESS OF PREPARING IT

Karl Streitwolf, Frankfort-on-the-Main, Alfred Fehrle, Bad-Soden-on-Taunus, and Walter Herrmann, and Paul Fritzsche, Frankfort-on-the-Main, Germany, assignors to Winthrop Chemical Company, Inc., New York, N. Y., a corporation of New York No Drawing. Application December 10, 1930, Serial No. 501,462. In Germany December 19, 1929

12 Claims. (Cl. 167—52)

The present invention relates to a process of preparing anæsthetics.

Solutions of anæsthetics having a hydrogen ion concentration corresponding to about that of blood or tissue (pH=7.3) show, besides diminished secondary effects, for instance, a reduced irritating effect, also a considerable increase in efficacy.

Now we have found that by the addition of small quantities of a free base of an anæsthetic to an anæsthetic, especially to the solution of an anæsthetic, for instance to the aqueous solution of an anæsthetic salt, solutions can easily be prepared which have the desired favourable hydrogen ion concentration. The addition of a relatively small proportion of the base will already suffice for influencing the hydrogen ion concentration in the desired manner. For instance a cocaine solution of 5% strength (pH=4.4) is brought to a hydrogen ion concentration of pH=7–7.1 by addition of 4% of the base calculated upon the quantity of the cocaine hydrochloride used. The free base added may be the same as or different from the base of the anæsthetic used.

If to the solution of a salt of an anæsthetic the same base which is based on the salt, is to be added, this can be done directly or indirectly, the latter by adding to the salt solution the quantity equivalent to the addition of the base of a stronger basic substance than it is the base itself.

A solution of the hydrochloride of para-aminobenzoyldiethylaminoethanol prepared according to the new process, has, for instance, compared with an ordinary solution of the same salt, an efficacy which is increased for 100%.

By evaporating in a vacuum the solution obtained according to this process, the preparations are obtained in a solid form. They dissolve in water to a clear solution.

The following examples serve to illustrate the invention, but they are not intended to limit it thereto.

1. 4 grams of the hydrochloride of para-aminobenzoyldiethylaminoethanol are dissolved in water in such a manner that 100 cc. of solution is obtained and 0.15 gram of the corresponding free base are added thereto. By shaking for one hour, the base is dissolved. The solution has a pH-value of 7.3.

2. 4 grams of the hydrochloride of para-aminobenzoyldiethylaminoethanol are dissolved as indicated in Example 1 and 0.15 gram of cocaine base is added to the solution. After shaking for about one hour, the base is dissolved. The pH-value amounts to 7.5.

3. 2.5 grams of cocaine hydrochloride are dissolved in water in such a manner that 50 cc. of solution is obtained and 0.1 gram of para-aminobenzoyldiethylaminoethanol is added to the solution thus obtained. After shaking for several hours undissolved parts are eliminated by filtering. The filtrate has a pH-value of 7.1.

4. 2.5 grams of cocaine hydrochloride are dissolved as indicated in Example 3 and 0.1 gram of cocaine base is added. After shaking for several hours, a trace of undissolved substance is eliminated by filtering. The solution has a pH-value of 7.1.

5. 20 grams of the hydrochloride of para-aminobenzoyldiethylaminoethanol are dissolved in water in such a manner that 100 cc. of solution is obtained. 0.75 gram of para-diethylaminoethanol are added to the solution and the whole is shaken until it is dissolved. The solution has a pH—value of 7.5.

Solutions of the other known anæsthetics can be prepared in the same manner.

We claim:

1. The process of preparing anæsthetics the solutions of which have a hydrogen ion concentration corresponding to about that of blood or tissue (pH=7.3), which process consists in adding the free base of an anæsthetic to the aqueous solution of an hydrochloride of an anæsthetic until a pH-value of about 7.3 is obtained, the said solutions possessing reduced secondary effects, especially a reduced irritating effect, and an increased efficacy.

2. The process of preparing anæsthetics the solutions of which have a hydrogen ion concentration corresponding to about that of blood or tissue (pH=7.3), which process consists in adding the free base of an anæsthetic to the aqueous solution of the hydrochloride of the corresponding anæsthetic until a pH-value of about 7.3 is obtained, the said solutions possessing reduced secondary effects, especially a reduced irritating effect, and an increased efficacy.

3. The process of preparing an anæsthetic the solution of which has a hydrogen ion concentration corresponding to about that of blood or tissue (pH=7.3), which process consists in adding para-aminobenzoyldiethylaminoethanol to the aqueous solution of the hydrochloride of para-aminobenzoyldiethylaminoethanol until a pH-value of about 7.3 is obtained, the said solution possessing reduced secondary effects, especially a reduced irritating effect, and an increased efficacy.

4. The process of preparing an anæsthetic the solution of which has a hydrogen ion concentration corresponding to about that of blood or tissue (pH=7.3), which process consists in adding 1 part of para-aminobenzoyldiethylaminoethanol to the aqueous solution of about 25 parts of the hydrochloride of para-aminobenzoyldiethylaminoethanol until a pH-value of about 7.3 is obtained, the said solution possessing reduced secondary effects, especially a reduced irritating effect, and an increased efficacy.

5. The process of preparing anæsthetics, the solutions of which have a hydrogen ion concentration corresponding to about that of blood or tissue (pH=7.3), which process consists in adding the free base of an anæsthetic to the aqueous solution of an hydrochloride of an anæsthetic until a pH-value of about 7.3 is obtained and evaporating the solution, the resultant products being soluble in water to a clear solution which possesses reduced secondary effects, especially a reduced irritating effect, and an increased efficacy.

6. The process of preparing anæsthetics the solutions of which have a hydrogen ion concentration corresponding to about that of blood or tissue (pH=7.3), which process consists in adding the free base of an anæsthetic to the aqueous solution of the hydrochloride of the corresponding anæsthetic salt until a pH-value of about 7.3 is obtained and evaporating the solution in a vacuum, the resulting products being soluble in water to a clear solution which possesses reduced secondary effects, especially a reduced irritating effect, and an increased efficacy.

7. The process of preparing an anæsthetic the solution of which has a hydrogen ion concentration corresponding to about that of blood or tissue (pH=7.3), which process consists in adding para-aminobenzoyldiethylaminoethanol to the aqueous solution of the hydrochloride of para-aminobenzoyldiethylaminoethanol until a pH-value of about 7.3 is obtained and evaporating the solution in a vacuum, the resulting products being soluble in water to a clear solution which possesses reduced secondary effects, especially a reduced irritating effect, and an increased efficacy.

8. The process of preparing an anæsthetic the solution of which has a hydrogen ion concentration corresponding to about that of blood or tissue (pH=7.3), which process consists in adding 1 part of para-aminobenzoyldiethylaminoethanol to the aqueous solution of about 25 parts of the hydrochloride of para-aminobenzoyldiethylaminoethanol until a pH-value of about 7.3 is obtained and evaporating the solution in a vacuum, the resultant products being soluble in water to a clear solution which possesses reduced secondary effects, especially a reduced irritating effect, and an increased efficacy.

9. As a composition of matter, the solid mixture of the hydrochloride of an anæsthetic with the free base of an anæsthetic, said mixture containing the components in such quantities that the aqueous solution of the mixture shows a pH-value of about 7.3.

10. As a composition of matter, the solid mixture of the hydrochloride of an anæsthetic with the corresponding free base of an anæsthetic, said mixture containing the components in such quantities that the aqueous solution of the mixture shows a pH-value of about 7.3.

11. As a composition of matter, the solid mixture of the hydrochloride of para-aminobenzoyldiethylaminoethanol with para-aminobenzoyldiethylaminoethanol, said mixture containing the components in such quantities that the aqueous solution of the mixture shows a pH-value of about 7.3.

12. As a composition of matter, the solid mixture of 25 parts of the hydrochloride of para-aminobenzoyldiethylaminoethanol with 1 part of para-aminobenzoyldiethylaminoethanol, less the aqueous solution of said mixture showing a pH-value of about 7.3.

KARL STREITWOLF.
ALFRED FEHRLE.
WALTER HERRMANN.
PAUL FRITZSCHE.